United States Patent [19]

Marwitz et al.

[11] 4,218,359
[45] Aug. 19, 1980

[54] ORGANOPOLYSILOXANE COMPOSITIONS AND A PROCESS FOR TREATING ORGANIC FIBERS

[75] Inventors: Heinrich Marwitz; Eckhart Louis, both of Burghausen, Fed. Rep. of Germany

[73] Assignee: Wacker-Chemie GmbH, Munich, Fed. Rep. of Germany

[21] Appl. No.: 910,032

[22] Filed: May 26, 1978

Related U.S. Application Data

[63] Continuation of Ser. No. 782,124, Mar. 28, 1977, abandoned.

[30] Foreign Application Priority Data

Apr. 7, 1976 [DE] Fed. Rep. of Germany ....... 2615078

[51] Int. Cl.$^2$ ............................................. C08K 5/02
[52] U.S. Cl. ........................... 260/33.8 SB; 260/18 S; 260/31.2 R; 260/32.8 SB; 260/33.2 SB; 260/33.4 SB; 260/33.6 SB; 428/446; 528/12; 528/20; 528/18; 528/34; 528/38; 528/901; 525/474
[58] Field of Search ......... 260/18 S, 33.8 SB, 31.2 R, 260/33.6 SB, 33.4 SB, 32.8 SB, 33.2 SB; 528/901, 34, 38, 11, 12, 18, 20; 525/342

[56] References Cited

U.S. PATENT DOCUMENTS

| | | | |
|---|---|---|---|
| 3,678,003 | 7/1972 | Kaiser et al. | 528/38 |
| 4,105,617 | 8/1978 | Clark et al. | 528/38 |

*Primary Examiner*—Melvyn I. Marquis

[57] ABSTRACT

An organopolysiloxane composition comprising
- (A) at least one diorganopolysiloxane containing Si-bonded terminal hydroxyl groups,
- (B) at least one organosilane of the general formula $RSiR'_nX_{3-n}$, in which R represents a monovalent group containing carbon, hydrogen, aminonitrogen and possibly oxygen, which contains at least 2 amino groups that are bonded to silicon via silicon-carbon bond, R' represents an alkyl or aryl group, X represents the same or different alkyl or substituted alkyl groups having from 1 to 14 carbon atoms which are bonded to silicon via oxygen, n is 0 or 1 and/or partial hydrolysates thereof,
- (C) at least one organosilane other than (B), having at least three oxime groups and, if desired,
- (D) at least one condensation catalyst and an organic solvent, and a process for treating organic fibers therewith.

7 Claims, No Drawings

ORGANOPOLYSILOXANE COMPOSITIONS AND A PROCESS FOR TREATING ORGANIC FIBERS

This is a continuation of application Ser. No. 782,124 filed Mar. 28, 1977 now abandoned.

BACKGROUND OF THE INVENTION

This invention relates to organopolysiloxane compositions and more particularly to organopolysiloxane compositions which may be used to treat organic fibers and to a process for treating organic fibers with these organopolysiloxane compositions. The treated organic fibers have improved resistance to abrasion and textiles made from these fibers have improved shrink resistance.

In comparison to the organopolysiloxane compositions disclosed in German Patent application No. 2,335,751 for treating keratin fibers, the compositions of this invention have greater stability under anhydrous conditions and when exposed to atmospheric moisture. Moreover, the compositions of this invention impart improved properties to organic fibers other than keratin fibers and the coated fibers cure more rapidly at room temperature.

The compositions of this invention not only exhibit improved storage stability under both anhydrous conditions and when exposed to atmospheric moisture, but also exhibit better adhesion and greater resistance to abrasion than the compositions disclosed in German Pat. No. 2,000,803.

Furthermore, the compositions of this invention have certain advantages over the compositions described in U.S. Pat. No. 3,668,001. For example, when the organopolysiloxane compositions of this invention are applied to fibers, they cure rapidly at room temperature. Also, when the compositions are applied to fibers, they exhibit better adhesion and the cured fibers are more resistant to abrasion. Moreover, textiles made from keratin fibers treated with the compositions of this invention show increased resistance to shrinkage.

Therefore it is an object of this invention to provide organopolysiloxane compositions which are more stable when stored under anhydrous conditions. Another object of this invention is to provide organopolysiloxane compositions which are stable under anhydrous conditions, but when exposed to moisture, cure rapidly at room temperature. Another object of this invention is to provide organopolysiloxane compositions which may be used in treating organic fibers. Still another object of this invention is to provide organopolysiloxane compositions which impart improved abrasion resistance to organic fibers treated therewith. A further object of this invention is to provide a process for treating fibers with organopolysiloxane compositions to impart abrasion resistance to fibers treated therewith. A still further object of this invention is to provide shrink resistant textiles. These and other objects will become apparent from the following description.

SUMMARY OF INVENTION

The present invention relates to organopolysiloxane compositions which are stable under substantially anhydrous conditions, but when exposed to moisture, cure at room temperature and to a process for treating organic fibers therewith. These organopolysiloxane compositions comprise:

(A) at least one diorganopolysiloxane containing terminal Si-bonded hydroxyl groups, (B) at least one organosilane having the general formula $RSiR'_nX_{3-n}$, in which R represents a monovalent group containing carbon, hydrogen, aminonitrogen and in some cases oxygen, which contains at least two amino groups that are bonded to silicon via silicon-carbon bond, R' represents an alkyl or aryl group, X is the same or different and represents alkyl groups which are linked to silicon via a silicon-oxygen bond, which may be substituted by an amino or an alkoxy group and which have a total of 1 to 14 carbon atoms per group, n is 0 or 1, and/or at least a partial hydrolysate of said organosilanes, (C) at least one organosilane other than (B) above, having three oxime groups and, if desired, (D) at least one condensation catalyst and an organic solvent.

When these compositions are applied to organic fibers and exposed to moisture, they cure at room temperature to form an elastomeric coating thereon.

DETAILED DESCRIPTION OF INVENTION

The diorganopolysiloxanes (A) having terminal Si-bonded hydroxyl groups, which have been used heretofore in the treatment of organic fibers may be used in the composition of this invention. These diorganopolysiloxanes may be represented by the general formula $$HOSiR''_2(OSiR''_2)_mOSiR''_2OH,$$

wherein R″ which may be the same or different represents monovalent, and substituted monovalent hydrocarbon radicals and m is a number whose value is such that the diorganopolysiloxanes (A) have an average viscosity of 100 to $10^7$ cP and more preferably from 1,000 to 100,000 cP at 25° C.

These diorganopolysiloxanes may also contain other siloxane units in addition to units of the formula $SiR'_2O$. Examples of other siloxane units which are generally present only as impurities, are those corresponding to the following formulas: $R''SiO_{3/2}$, 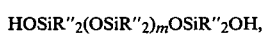 $R''_3SiO_{\frac{1}{2}}$ and $SiO_{4/2}$; where R″ is the same as above. Such other siloxane units should not be present in excess of about 10 mol percent and more preferably no more than about 1 mol percent.

It is preferred that the organic radicals in the diorganopolysiloxanes (A) contain less than 30 carbon atoms per organic radical. Examples of suitable organic radicals represented by R″ in the formulas above are alkyl radicals, such as the methyl, ethyl, n-propyl and isopropyl radical as well as octadecyl radicals; alkenyl radicals such as the vinyl and allyl radicals; cycloaliphatic hydrocarbon radicals such as the cyclohexyl, cyclohexenyl and cycloheptyl radicals; aryl radicals such as the phenyl radical; alkaryl radicals such as tolyl radicals; and aralkyl radicals such as the benzyl radical. Examples of substituted hydrocarbon radicals are halogenated hydrocarbon radicals such as the 3,3,3-trifluoropropyl radical and o-, p- and m-chlorophenyl radicals; and cyanalkyl radicals, such as the beta-cyanoethyl radical. Because of their availability, it is preferably that at least 50 percent and more preferably at least 95 percent of the number of R″ radicals in the diorganopolysiloxanes (A) be methyl radicals.

Also, mixtures containing various diorganopolysiloxanes (A), especially mixtures consisting of at least one diorganopolysiloxane (A) having a viscosity of less than 50,000 cP at 25° C. and at least one diorganopolysiloxane having a viscosity of more than $10^6$ cP at 25° C. may be used. It is preferred that the viscosity of the mixtures be a maximum of about 100,000 cP at 25° C.

The organosilanes (B) may be represented by the general formula $RSiR'_nX_{3-n}$, where R, R', X and n is the same as above and/or partial hydrolysates thereof.

The terms "aminonitrogen" or "amino groups" used in regard to the definition of R, are intended to include imine nitrogen or imino groups.

It is preferred that the nitrogen atom closest to the silicon atom be bonded to a carbon atom which is adjacent to the silicon atom such as occurs, for example in the following group.

$SiCH_2NHC_2H_4NH_2$, or to a carbon atom which is at least in a gamma position to the silicon atom, as occurs for example in the following group $Si(CH_2)_3NHC_2H_4NH_2$.

Also, it is preferred that the number of carbon atoms in the R radicals not exceed about 20 and that any oxygen present in R be in the form of an ester and/or ether grouping.

Suitable examples of R groups are those represented by the following formulas:

—$(CH_2)_3NHCH_2CH_2NH_2$(=N-beta-Aminoethyl-gamma-Aminopropyl),
—$(CH_2)_4NHCH_2CH_2NH_2$,
—$(CH_2)_4NHCH_2CH_2NHCH_3$,
—$(CH_2)_3NHCH_2CH_2NHCH_2CH_2NH_2$,
—$CH_2CH(CH_3)CH_2NHCH_2CH_2NH_2$,
—$(CH_2)_3NHCH_2C$-$H_2$—$CH(CH_2)_3NH_2CH_2CH_2NH_2$,
—$(CH_2)_3NH(CH_2)_2NH(CH_2)_2COOCH_3$,
—$(CH_2)_3O(CH_2)_3NH(CH_2)_2NH_2$.

The radicals represented by R' preferably are alkyl and aryl radicals having from 1 to 18 carbon atoms. The radicals represented by R' may be the same as those described for R". However, it is preferred that n have a value of zero.

Preferred examples of X are alkyl radicals having from 1 to 6 carbon atoms, such as the methyl, ethyl and n-butyl radicals, amino-alkyl radicals, such as the beta-aminoethyl radical and alkoxyalkyl radicals, such as the beta-methoxyethyl radical.

It is preferred that the organosilanes (B) and/or partial hydrolysates thereof be employed in amounts of from 0.5 to 50 percent by weight, and more preferably in amounts of from 1 to 20 percent by weight based on the weight of the diorganopolysiloxane (A) employed.

The organosilanes (C) may be represented by the general formula:

$R''Si(ON=CX)_3$ where R" is the same as above and X is R"$_2$ or a bivalent, radical in which the two valences are attached to the C of the C=NO group, or a halogenated hydrocarbon radical. However it is preferred that X be R". Suitable examples of R" are the same as those described for R" in the diorganopolysiloxanes (A). Methyltris-(ethylmethylketoximo)-silane, i.e., the silane corresponding to the following formula $CH_3Si[ON=C(CH_3)C_2H_5]_3$, is particularly preferred as the organosilane (C). Another example of an organosilane (C) is methyltris-(acetonoximo)-silane.

The following is an example of a bivalent hydrocarbon radical represented by X:

—$CH_2(CH_2)_3CH_2$—.

Other bivalent hydrocarbon and halogenated hydrocarbon radicals are

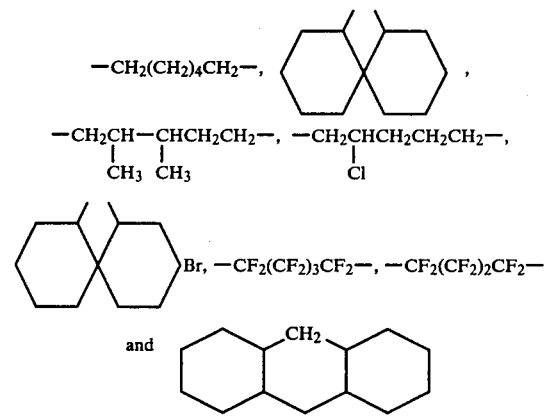

—$CH_2(CH_2)_4CH_2$—,

—$CH_2CH$—$CHCH_2CH_2$—, —$CH_2CHCH_2CH_2CH_2$—,
  |   |                    |
  $CH_3$ $CH_3$             Cl

Br, —$CF_2(CF_2)_3CF_2$—, —$CF_2(CF_2)_2CF_2$— and

Silanes corresponding to the general formula:
Ti R"Si(ON=CX)$_3$ are known in the art.

It is preferred that the organosilanes (C) be employed in an amount of from 1 to 30 percent by weight based on the total weight of the organosilicon compounds (A) and (B).

The tin acylates (D) employed in the process of this invention may be the same tin acylates which have been used heretofore to accelerate the condensation of organosilicon compositions containing condensable groups. Examples of suitable tin acylates are organotin acylates, such as dialkyltin acylates, especially those whose alkyl groups as well as acyl groups having from 1 to 12 carbon atoms, e.g., di-n-butyltin dilaurate, di-n-butyltin diacetate, di-n-butyltin di(2-ethylhexoate), di-n-butyltin salts or aliphatic carboxylic acids, which are branched in the alpha position with respect to the carboxyl group and which have 9 to 11 carbon atoms for each acid molecule; di-n-octyltin diformate and di-n-octyltin dipropionate. Other tin acylates (D) are tin carboxylic acid salts, such as tin-II-octoate and acyloxydistannoxanes, such as diacetoxytetrabutyldistannoxane and dioleoyloxytetramethyldistannoxane.

When the tin acylates (D) are employed, they are preferably used in an amount of from 0.1 to 5 percent by weight based on the total weight of the organosilicon compounds (A), (B) and (C).

In the preparation of the organopolysiloxane compositions of this invention, the same organic solvents which have been used heretofore in treating organic fibers with organosilicon compounds may be used in this invention. Examples of suitable solvents which may be employed are alkanes having a boiling point in the range of from 120° to 180° C.; aromatic hydrocarbons such as toluene, xylenes and trimethylbenzene; chlorinated hydrocarbons such as trichloroethylene, 1,1,1-trichloroethane and perchloroethylene; alcohols such as ethanol and isopropanol; ethers such as diethyl ether and n-di-butyl ether; ketones, such as acetone, methyl ethyl ketone and cyclohexanone; as well as esters such as ethylacetate. Mixtures of the various solvents may also be employed.

The concentration of components (A), (B) and (C) and if desired (D), in the organic solvent is not critical, however it is preferred that they be present in an amount of from about 0.1 to 15 percent by weight based on the weight of the components.

Components (A), (B), (C) and when desired, component (D) can be mixed in any sequence. The resulting mixture can be stored and remain usable for from 1 to 2 weeks even when exposed to the moisture present in atmospheric air. When they are stored under substantially anhydrous conditions, the mixtures remain usable practically indefinitely.

The organopolysiloxane compositions of this invention can be used to treat any organic fibers which have been treated heretofore with organopolysiloxanes. Examples of such fibers are those made of keratin (wool and leather), cotton, rayon, hemp, natural silk, polypropylene, polyethylene, polyester, polyurethane, polyamides, cellulose acetate and polyacrylonitrile, as well as mixtures of such fibers. The fibers can be present in the form of leather, fleeces, mats, woven or knitted textiles, including finished clothing or parts thereof.

Such organic fibers can be treated with the organopolysiloxane compositions by any technique known in the art for applying liquids to fibers, for example by spraying, including spraying from aerosol cans, immersion, coating, calendering or padding.

It is preferred that the organopolysiloxane compositions of this invention be applied to the fibers at the rate of from 0.125 gm to 50 gm of the reaction product and/or mixture comprising components (A), (B) and (C) for each square meter of treated fiber material.

Following the evaporation of the solvent or solvents, the organopolysiloxane composition is cured on the fibers and forms an elastomeric coating thereon.

The curing or cross-linking will occur at room temperature in the presence of moisture. Generally the moisture present in atmospheric air is sufficient for this purpose. The curing or cross-linking can be accelerated by using increased temperatures, for example on the order of 60° to 140° C. and/or by increasing the moisture content of the atmospheric air. The elastomeric coating imparts hydrophobic properties to the treated objects; increases the ability of the treated object to retain its shape and its elasticity, imparts shrink resistance and felting to the treated object and also improves the appearance of the surface of woven or knitted textiles.

Objects, such as tents, clothing, e.g., ski outfits and shoes, may also be treated with the compositions of this invention by the consumer, if desired.

In the following examples all parts and percentages are by weight unless otherwise specified.

EXAMPLE 1

(a) About 5.0 parts of a dimethylpolysiloxane having terminal Si-bonded hydroxyl groups and a 500 mkp factor as determined with a Brabender-Plastograph at 25° C. and 60 rpm (a Brabender Plastograph is illustrated on page 25 in the book by K. Frank, "Prufungsbuch fur Kautschuk and Kunststoffe," Stuttgart, 1955), are mixed with 35.0 parts of a dimethylpolysiloxane having terminal Si-bonded hydroxyl groups and a viscosity of 20,000 cP at 25° C.; 43.2 parts trichloroethylene, 13.0 parts methyltris-(ethylmethylketoximo)-silane, 2.5 parts N-beta-aminoethyl-gamma-aminopropyltrimethoxysilane, and 1.3 parts n-di-butyltin dilaurate.

(b) The mixture described in Example 1 (a) above is diluted with 10 times its weight with trichloroethylene. A wool fabric is immersed and soaked in the organopolysiloxane composition until it has absorbed 100 percent of its weight in liquid and then exposed to atmospheric moisture at room temperature over a period of 2 hours. The fabric retains its shape and is elastic to the touch.

EXAMPLE 2

(a) About 40.0 parts of a dimethylpolysiloxane having Si-bonded terminal hydroxyl groups and viscosity of 5,000 cP at 25° C., are mixed with 44.5 parts of perchloroethylene, 13.0 parts of methyltris-(ethylmethylketoximo)-silane and 2.5 parts of N-beta-aminoethyl-gamma-aminopropyltrimethoxysilane.

(b) The mixture described in Example 2 (a) is diluted with perchloroethylene at the rate of 10 times its weight. A piece of cotton fabric is immersed in the organopolysiloxane composition until it has absorbed 100 percent of its weight in liquid, then exposed to a temperature of 120° C. for 30 seconds in order to remove the solvent and then contacted with atmospheric moisture at room temperature for 24 hours. The treated fabric retains its shape and is elastic to the touch.

EXAMPLE 3

About 7 parts of the mixture whose preparation is described in Example 2 (a) above, are diluted with 93 parts of perchloroethylene. A wool fabric (double knit) is immersed in the organopolysiloxane composition thus obtained until it has absorbed 100 percent of its weight in liquid. The fabric is dried for 24 hours in atmospheric moisture at room temperature.

In order to determine the resistance to shrinkage, the treated fabric is washed in a washing machine for 3 hours at 40° C. with the aid of a special wool detergent ("Perwoll," a registered trademark, cf. Dr. Otto-Albrecht Neumuller, "Rompps Chemie-Lexikon," 7th edition, Stuttgart, 1974, pages 2574/5). The area shrinkage is determined and found to be 4.4 percent while an untreated similarly washed control specimen of the same fabric shrunk 28.6 percent.

The washability and the resistance to shrinkage of keratin fibers treated with the organopolysiloxane composition of this invention complies with the requirements of the International Wool Secretariat for Machine Washable Wool Textiles.

EXAMPLE 4

The mixture whose preparation is described in Example 1 (a) is diluted with perchloroethylene at the rate of 4 times its weight. Cowhide samples are immersed in the organopolysiloxane composition thus obtained for 15 minutes and then exposed for 2 hours to atmospheric moisture at room temperature. The time required for water to penetrate the leather is determined with the aid of a Bally tester which bends the leather at the rate of 3,000 times per hour. The test reveals that the leather treated with the organopolysiloxane composition is not penetrated by water until after 10 to 12 hours have elapsed, whereas untreated cowhide of the same type is penetrated by water after only 10 to 25 minutes.

In another test, leather shoes are coated with the aid of a brush with the mixture whose preparation is described in Example 1 (a) which has been diluted with perchloroethylene at the rate of 4 times its weight. The shoes are then exposed to normal atmospheric moisture at room temperature for 24 hours.

When these shoes were worn for 2 hours while walking through melting snow, water did not penetrate through the leather. The same shoes also proved to be entirely waterproof when worn in the rain over an extended period of time. However, prior to treating the shoes, they were penetrated by water after walking in the rain for from 10 to 15 minutes.

What is claimed is:

1. An organopolysiloxane composition for treating fibers which can be stored under substantially anhydrous conditions but cures when exposed to moisture consisting of (A) a diorganopolysiloxane having terminal Si-bonded hydroxyl groups, (B) an organosilicon compound selected from the group consisting of organosilanes of the formula $RSiR'_nX_{3-n}$, in which R is a monovalent radical having at least two amino groups which are bonded to silicon via silicon-carbon bonds, R' is selected from the group consisting of alkyl and aryl radicals, X is selected from the group consisting of alkyl and substituted alkyl radicals having from 1 to 14 carbon atoms per group which are bonded to silicon via oxygen, n is 0 or 1, partial hydrolysates of said organosilanes and mixtures thereof, (C) an organosilane other than (B) having the formula $$R''Si(ON=CX)_3$$

where R" is selected from the group consisting of monovalent hydrocarbon radicals and halogenated monovalent hydrocarbon radicals, and X is selected from the group consisting of $R''_2$, a bivalent hydrocarbon radical and a halogenated hydrocarbon radical, (D) a condensation catalyst and an organic solvent.

2. The composition of claim 1, wherein the organic solvent is a chlorinated hydrocarbon.

3. The composition of claim 1, wherein the monovalent radical R contains carbon, hydrogen, and an aminonitrogen.

4. The composition of claim 1, wherein the monovalent radical R contains carbon, hydrogen, oxygen and an aminonitrogen.

5. The composition of claim 1, wherein the catalyst (D) is a tin acylate.

6. The composition of claim 1, wherein the organosilane (C) is present in an amount of from 1 to 30 percent by weight based on the weight of organosilicon compounds (A) and (B).

7. The composition of claim 1 wherein the organosilane (C) is methyltris-(ethylmethylketoximo)-silane.

* * * * *